US006983849B1

(12) United States Patent
Toler et al.

(10) Patent No.: US 6,983,849 B1
(45) Date of Patent: Jan. 10, 2006

(54) SCREEN REPAIR APPARATUS AND METHOD

(75) Inventors: Kevin M. Toler, Princeton, WV (US); David C. Bell, Deer Park, MD (US)

(73) Assignee: Norris Screen & Manufacturing, Inc., Princeton, WV (US)

( * ) Notice: Subject to any disclaimer, the term of this patent is extended or adjusted under 35 U.S.C. 154(b) by 0 days.

(21) Appl. No.: 10/781,532

(22) Filed: Feb. 18, 2004

(51) Int. Cl.
*B23D 19/00* (2006.01)
*B07B 1/49* (2006.01)

(52) U.S. Cl. ...................... 209/659; 209/674; 209/675; 209/680; 29/402.09; 29/402.11

(58) Field of Classification Search ................ 209/659, 209/674; 245/2; 29/402.09, 402.1, 402.11, 29/402.12, 402.14
See application file for complete search history.

(56) References Cited

U.S. PATENT DOCUMENTS

| | | | | |
|---|---|---|---|---|
| 1,324,845 | A * | 12/1919 | Osgood | 245/2 |
| 1,749,755 | A * | 3/1930 | Downer | 245/2 |
| 1,792,594 | A * | 2/1931 | Litwin | 245/2 |
| 1,927,826 | A | 9/1933 | Friday | |
| 1,998,033 | A | 4/1935 | Tucker | |
| 2,226,449 | A * | 12/1940 | Stephens | 139/1 R |
| 2,241,257 | A | 5/1941 | Gronberg | |
| 2,272,196 | A | 2/1942 | Gittens | |
| 2,283,803 | A | 5/1942 | Gittens | |
| 2,397,646 | A | 4/1946 | Brown et al. | |
| 2,487,830 | A | 11/1949 | Robbins, II | |
| 3,261,393 | A | 7/1966 | Templeton | |
| 3,681,841 | A * | 8/1972 | LeBlanc et al. | 29/402.13 |
| 4,163,817 | A * | 8/1979 | DiCarlantonio et al. | 428/33 |
| 4,222,162 | A * | 9/1980 | Levy et al. | 29/402.09 |
| 4,760,980 | A | 8/1988 | Sharpe | |
| 4,926,533 | A * | 5/1990 | Couture | 29/33 F |
| 5,275,293 | A | 1/1994 | Crider | |
| 5,350,481 | A * | 9/1994 | Shepard et al. | 156/423 |

(Continued)

*Primary Examiner*—Donald P. Walsh
*Assistant Examiner*—Jonathan R Miller
(74) *Attorney, Agent, or Firm*—Anthony P. Tokarz; John J. Giblin, Jr.; Bowles Rice McDavid Graff & Love LLP

(57) ABSTRACT

A screen repair apparatus is disclosed for temporarily repairing holes or worn screen elements of screens used in gyratory or vibratory screening machines in the coal mining and rock quarrying industries. The apparatus is comprised of a flat plate which covers the damaged area of screen on the screen's top, a number of duplex jaws which are used to clamp the apparatus to the lower surface of the screen elements, and a clamping means, including an attachment rod which draws together the plate and duplex jaws on either side of the screen elements, thereby clamping the two to the screen. The screen repair apparatus also is comprised of a set of cauls, which are disposed between the clamping means and the upper surface of the plate and which distribute the force exerted by the clamping means across the face of the upper surface of the plate. The clamping means may include an attachment rod which is rigidly attached to the duplex jaw and a nut which engages external threads on the end of the rod opposite the duplex jaw. The clamping means may also include an attachment rod in the form of a bolt which registers with threads within a hole in the duplex jaw and a bolt head which engages the upper surface of the plate. A method is provided for repairing a damaged or worn screen by utilizing and installing the screen repair apparatus disclosed herein.

11 Claims, 2 Drawing Sheets

U.S. PATENT DOCUMENTS 5,816,413 A * 10/1998 Boccabella et al. ......... 209/399
6,027,079 A * 2/2000 Santoro ......................... 245/2
6,067,338 A * 5/2000 Erbes ......................... 376/302
6,805,937 B1 * 10/2004 Toth ............................ 428/99

* cited by examiner

SCREEN REPAIR APPARATUS AND METHOD

BACKGROUND OF THE INVENTION

1. Field of the Invention

The invention disclosed herein relates to screens in vibratory or gyratory screening machines used to separate granular materials in the coal and rock aggregate industries. Specifically, it relates to an apparatus and a method for repairing holes and other damage in those screens.

2. Description of the Prior Art

In the coal mining industry, as well as the rock quarrying industry, the coal and rock aggregates produced from the mine or quarry are usually separated or classified according to the size of the aggregate fractions. In addition, mined coal usually must be "cleaned" to separate aggregates and other undesired materials from the coal.

These separation and cleaning operations are typically accomplished using gyratory or vibratory screening machines. The machines have a number of screens which are typically installed horizontally within the machine. In the machines, the coal or rock mining products are introduced onto the upper surface of the screen. The machine imparts a gyratory or vibratory motion to the screen which causes fractions of aggregate smaller than the apertures of the screen to fall through the screen, while the remaining larger fractions are discharged from the upper surface.

The screens themselves may be constructed by several designs. One design common in the coal industries comprises a plurality of parallel metal bars, with rectangular or circular cross sections. The spacing or opening between the bars is set to the desired specification of the aggregates to be classified. In another design, metal wire is woven into an open mesh with a simple weave pattern, to produce generally square openings bounded between adjacent warp and weft wires.

The rock aggregates, including those aggregate impurities contained in coal, are hard and abrasive and will cause gradual wear on the screen elements. This wear often produces holes in the screen surface. When this happens, larger fractions of the coal or rock aggregate are permitted to pass down through the screen, thereby either reducing the yield of the desired larger fraction collected from the screen or contaminating the smaller desired rock fraction passing through the screen.

When a hole is created in a screen, the screen must either be repaired or replaced. Generally, a temporary repair means is initially utilized, which can be implemented relatively quickly, until the screen can be replaced during a longer scheduled cessation of operations. Temporary methods of repair include welding steel plates to the screen or filling and sealing the hole with silicone sealant or other pliable substance. However, these methods can be either time consuming to implement or may not be sufficiently reliable.

SUMMARY OF THE INVENTION

To provide a better, more secure and more durable means for temporarily patching a hole in an aggregate screen, disclosed herein is a repair apparatus which is comprised of a flat plate made of a resilient material, which is placed on the upper surface of the damaged screen, covering the hole. A plurality of clamping arms, each comprised of an attachment rod with a duplex jaw disposed at one end of the rod, are used in one of several clamping means to clamp the plate against the screen's upper surface with the duplex jaws against the screen's lower surface.

One object of this invention is to provide an easy and expedious means for repairing damages in a vibratory or gyratory screen section.

Another object of this invention is to provide a screen repair apparatus which is inexpensive and durable.

Another object of this invention is to provide a screen repair apparatus which is capable of temporarily repairing damaged section in a variety of screen designs.

These and other objectives and advantages of the invention will become apparent from the description which follows. In the description, reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

DETAILED DESCRIPTION OF THE INVENTION

The following discussion describes in detail one or more embodiments of the invention. This discussion should not be construed, however, as limiting the invention to those particular embodiments, and practitioners skilled in the art will recognize numerous other embodiments as well. The complete scope of the invention is defined in the claims appended hereto.

Figure 1:
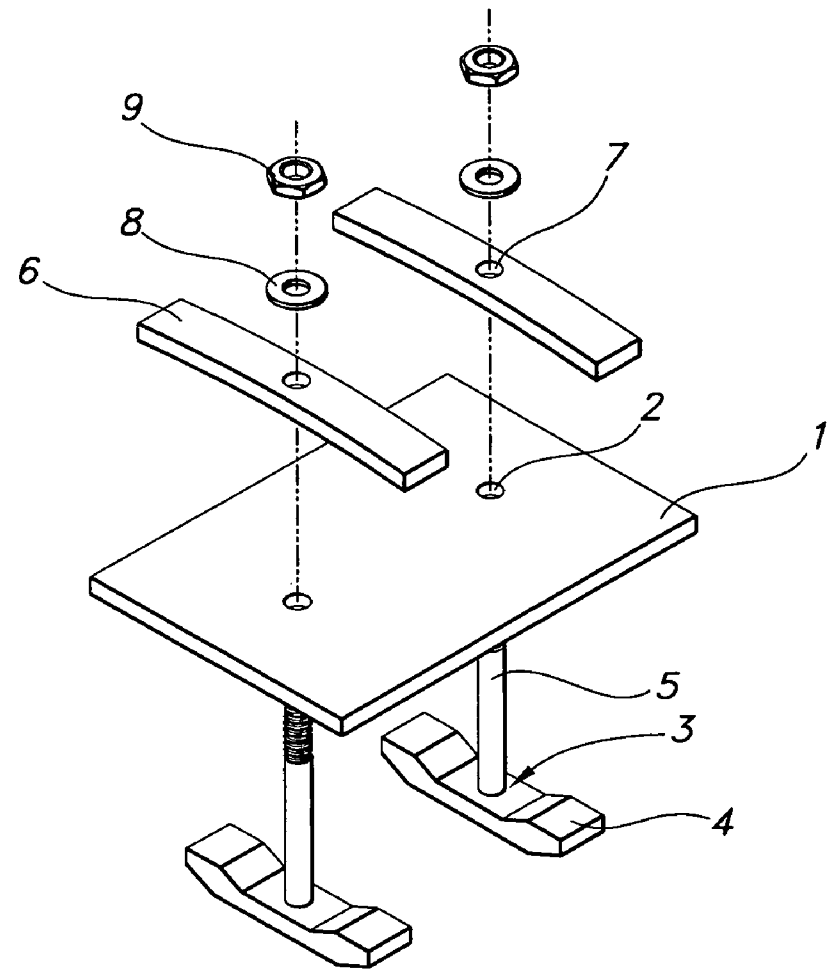
FIG. 1 is an exploded perspective view of the screen repair apparatus.
Figure 2:
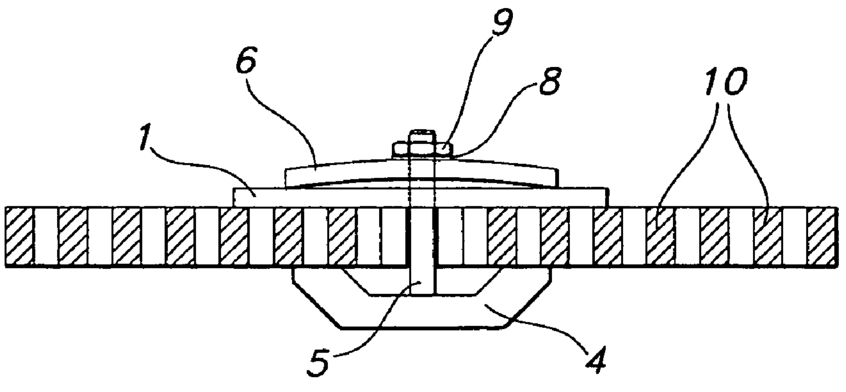
FIG. 2 is an elevation end view of the screen repair apparatus installed on a screen.

As shown in FIG. 1, a screen repair apparatus is comprised of a plate 1. The plate 1 may be flat, or have a slight incurvature in one direction on its lower surface. It would preferably be manufactured from a strong, resilient, abrasion resistant material, such as polyurethane, or may be made from other materials such as steel, metal alloys or various plastics. In one embodiment, as shown in FIG. 2, the plate 1 has a plurality of openings or slots of the same size and spacing as the screen 10 being repaired. The plate 1 has a plurality of holes 2 vertically disposed through its thickness. If the lower surface of the plate 1 is incurved, rather than flat, the holes 2 are aligned collinear with the axis of the incurve.

The screen repair apparatus also is comprised of a plurality of clamping arms, each of which is comprised of an attachment rod 5 and a duplex jaw 3 which provide the means for clamping the plate 1 to the screen. A clamping arm is provided for each of the holes 2 in the plate 1. The duplex jaws 3 are disposed at the proximal end of the attachment rod 5. Each duplex jaw 3 is, generally, an oblong block or parallelepiped having an upper and a lower surface. In the preferred embodiments, a section of the upper surface, centered along the overall upper surface is incurved or recessed towards the major center axis of the duplex jaws 3, leaving an elevated flat area 4 at either end of the upper surface of the duplex jaws 3. The corners of the lower surface may be chamfered, or formed into a convex curve extending from either end of the upper surface, which, in either case, gives the duplex jaws 3 an overall arcuate shape. Each attachment rod 5 has a circular cross-section and traverses through a hole 2 in the plate 1 and has disposed part of the clamping means at its distal end. The clamping means is used to draw the flat areas of the duplex jaw 3 towards the lower surface of the plate 1 by pulling the duplex jaws 3 towards the plate 1.

In the preferred embodiment of the clamping means, the proximal end of the attachment rod 5 rigidly engages with the center of the upper surface, in the center of the recessed section of the duplex jaw 2. The clamping means is comprised of external threads circumferentially disposed on the distal end of the attachment rod 5, a washer 8 coaxially registered onto the distal end of the attachment rod 5, and a internally threaded nut 9 rotationally engaged with the external threads of the attachment rod 5.

Figure 4:
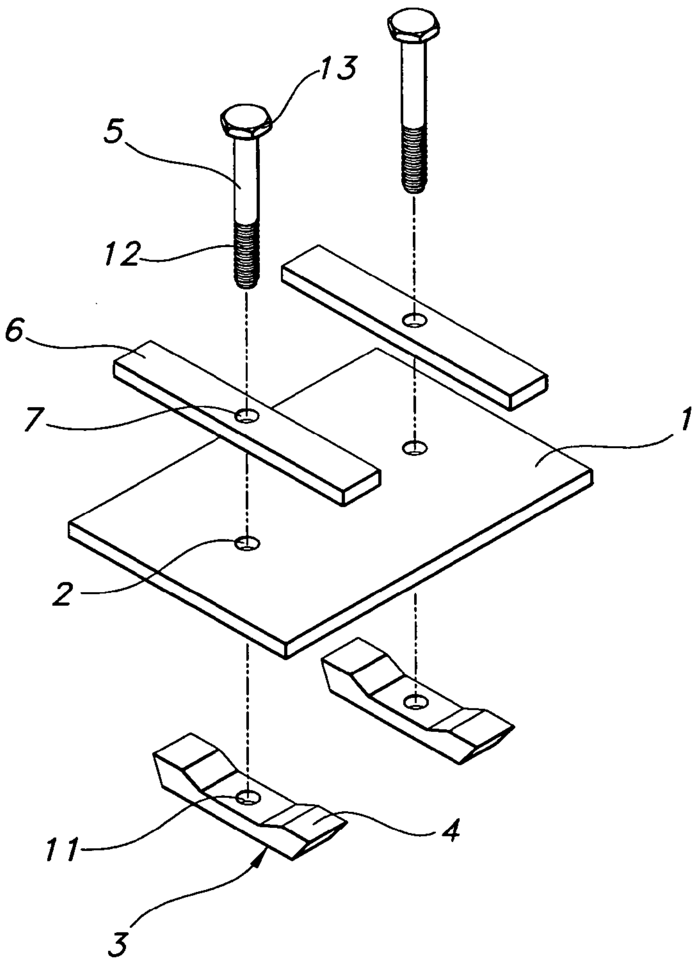
FIG. 4 is a perspective view of an alternative embodiment of the clamping means.

In another embodiment of the clamping means, as shown in FIG. 4, the duplex jaws 3 are essentially the same as in the first embodiment, except that the attachment rod 5 is not rigidly attached to the duplex jaws, and for a hole 11 disposed through the thickness of the duplex jaws, centrally disposed longitudinally and laterally on the upper surface. The hole 11 is internally threaded. The proximal end of the attachment rod 5 is externally threaded 12, which rotationally engages the internal threads of the central hole 11 in the duplex jaw 3. The distal end of the attachment rod 5 is formed into a bolt head 13 to which a wrench or other means common in the art may be used to apply torque to rotate the attachment rod 5.

In the preferred embodiment, the invention includes a plurality of cauls 6, one each of which is used with each clamping rod. The caul 6 is an oblong block or rectangular parallelepiped in shape, and is preferably slightly arcuate longitudinally, with its concave side facing downwards towards the plate 1. A hole 7 is disposed vertically through the center of the caul 7, through which passes the attachment rod 5. The caul 6 is disposed intermediately between the upper surface of the plate 1 and the clamping means. The caul 6 distributes the pressure of the clamping means more uniformly across the upper surface of the plate 1. The caul 6 may be manufactured from any strong resilient material, preferably polyurethane.

Figure 3:
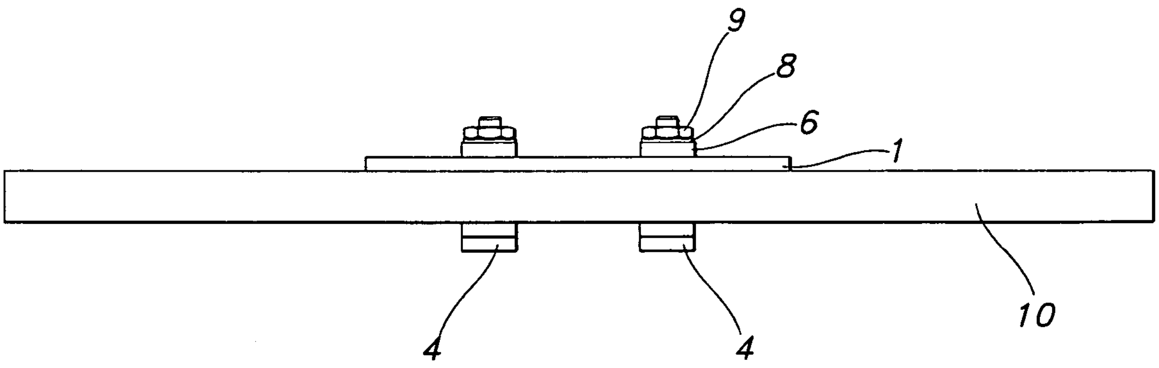
FIG. 3 is an elevation side view of the screen repair apparatus installed on a screen.

As demonstrated in FIGS. 2 and 3, the preferred embodiment of the screen repair apparatus is utilized to repair a damaged section of a screen by positing the plate 1 on the upper surface of the screen elements 10 so as to cover the damaged section of the screen. If the plate 1 has a concave lower surface, that concave surface is placed in communication with the upper surface of the screen elements 10. The clamping arms are positioned on the lower side of the screen, and the attachment rods 5 travel transversely between screen elements 10 of the screen, and register with the holes 2 of the plate 1 and, if provided, the holes 7 of the cauls 6. The attachment rods 5 are inserted through the screen elements 10 until the duplex arms 3 register with the lower surface of the screen elements 10. In registering with the screen elements 10, the flat areas 4 at either end of the duplex jaws 3 are brought into contact with one or more screen elements 10. The clamping means are then executed onto the distal end of each attachment rod 5 protruding from the caul 6, if applicable, or the plate 1. In the preferred embodiment of the clamping means, the washer 8 is engaged with the distil end of the attachment rod 5 and the internal threads of the nut 9 are registered with the external threads on the distil end of the attachment rod 5. The nut 9 is then rotated, causing the attachment rod 5 to move laterally through the holes 2 in the plate 1 and caul 6, bringing the flat area 4 of the duplex jaw 3 into communication with the lower surface of the screen elements 10.

In the alternative embodiment of the clamping means, as shown in FIG. 4, the invention is utilized by positing the plate 1 over the damaged section of screen, positing the caul 6, if desired, with the holes 7 of the caul 6 and plate 1 coaxially aligned, then registering the distal end of the attachment rod 5, with the external threads 12, through the top of the caul 6, if provided, through the hole 2 in the plate 1, and down between elements of the screen 10, such that the external threads 12 are exposed below the lower surface of the screen. The internal threads of the central hole 11 of the duplex jaws 3 are then registered with the external threads 12 of the distal end of the attachment rod 5, and the attachment rod 5 is rotated by applying torque to the bolt head 13 on the distal end, thereby causing upward longitudinal movement of the duplex jaws 3 until the flat areas engage with the lower surface of the screen elements.

While various embodiments of the present invention have been described above, it should be understood that they have been presented by way of example, and not of limitation. It will be apparent to persons skilled in the relevant art that various changes in form and detail may be made therein without departing from the spirit and scope and application of the invention. This is especially true in light of technology and terms within the relevant art that may be later developed. Thus, the present invention should not be limited by any of the above-described exemplary embodiments, but should only be defined in accordance with the appended claims and their equivalents.

We claim:

1. A screen repair apparatus for temporarily repairing damaged sections of vibratory or gyratory screens, comprising:

a. a plate having an upper and lower surface and a plurality of holes disposed through the thickness of the plate;

b. a plurality of duplex jaws, wherein the number of duplex jaws equals the number of holes in the plate, and wherein each duplex jaw has an upper and lower surface, has an incurved section along the upper surface of each duplex jaw, the length of which is less than the overall length of the upper surface, and has a raised flat section at either end of the upper surface of each duplex jaw;

c. an attachment rod with a proximal and a distal end, the proximal end of which is fastened orthogonally to the center of each duplex jaw between the two ends of the upper surface; and d. a clamping means for utilizing the attachment rod the distal end of which passes through the holes in the plate to draw together the duplex jaw and the plate against the lower and upper surfaces, respectively, of the screen with the raised flat sections parallel to the screen.

2. The screen repair device of claim 1, wherein the plate is comprised of a plurality of openings or slots through its thickness, sized and spaced equally to that of the damaged screen.

3. The screen repair apparatus of claim 1, wherein the plate is steel, aluminum or a resilient polymer.

4. The screen repair apparatus of claim 3, wherein the resilient polymer is polyurethane.

5. The screen repair apparatus of claim 1, wherein the lower surface of the plate is incurved.

6. The screen repair apparatus of claim 1, further comprising a plurality of cauls, each caul being oblong in shape and having upper and lower surfaces and a vertical hole in the center of the caul, whereby one of the cauls is disposed between the upper surface of the plate and each of the clamping means with the attachment rod disposed through the hole in the caul.

7. The screen repair apparatus of claim 6, wherein the lower surface of the cauls are incurved.

8. A method for temporarily repairing damaged or worn sections of vibratory or gyratory screen, wherein the screen is comprised of a plurality of screen elements disposed with a specified spacing between the elements, comprising the steps of:

a. placing a plate, having an upper and a lower surface and a plurality of holes disposed through the thickness of the plates, onto the upper surface of the screen, covering the damaged or worn section, with the lower surface of the plate in communication with the upper surface of the screen;

b. registering a clamping arm, comprised of a duplex jaw having an upper surface with two flat areas on the upper surface and an elongated attachment rod one end of said attachment rod fastened to the center of said duplex jaw, with the plate, wherein the other end of the attachment rod passes between elements of the screen and engages with one of the holes in the plate and the flat areas of the duplex jaws engage with the lower surface of the screen; and c. engaging a clamping means on the clamping arm for compressing the lower surface of the plate and the flat areas of the duplex jaws in parallel with and against either surface of the screen elements.

9. A screen repair apparatus for temporarily repairing damaged sections of vibratory or gyratory screens, comprising:

a. a plate having an upper and an incurved lower surface and a plurality of holes disposed through the thickness of the plate;

b. a plurality of duplex jaws, wherein the number of duplex jaws equals the number of holes in the plate, and wherein each duplex jaw has an upper and lower surface, has an incurved section along the upper surface of each duplex jaw, the length of which is less than the overall length of the upper surface, and has a raised flat section at either end of the upper surface of each duplex jaw;

c. an attachment rod, the proximal end of which is in communication orthogonally to the center of each duplex jaw; and d. clamping means for utilizing the attachment rod to draw together the duplex jaw and the plate against the lower and upper surfaces, respectively, of the screen.

10. A screen repair apparatus for temporarily repairing damaged sections of vibratory or gyratory screens, comprising:

a. a plate having an upper and lower surface and a plurality of holes disposed through the thickness of the plate;

b. a plurality of duplex jaws, wherein the number of duplex jaws equals the number of holes in the plate, and wherein each duplex jaw has an upper and lower surface, has an incurved section along the upper surface of each duplex jaw, the length of which is less than the overall length of the upper surface, and has a raised flat section at either end of the upper surface of each duplex jaw;

c. An attachment rod, the proximal end of which is in communication orthogonally to the center of each duplex jaw; and d. clamping means for utilizing the attachment rod to draw together the duplex jaw and the plate against the lower and upper surfaces, respectively, of the screen, e. a plurality of cauls, each caul being oblong in shape and having upper and lower surfaces and a vertical hole in the center of the caul, whereby one of the cauls is disposed between the upper surface of the plate and each of the clamping means with the attachment rod disposed through the hole in the caul.

11. The screen repair apparatus of claim 10, wherein the lower surfaces of the cauls are incurved.

* * * * *